(12) United States Patent
Pazdirek

(10) Patent No.: US 7,354,054 B2
(45) Date of Patent: *Apr. 8, 2008

(54) LINK ASSEMBLY FOR A VEHICLE SUSPENSION SYSTEM

(75) Inventor: Jiri Pazdirek, Schaumburg, IL (US)

(73) Assignee: MacLean-Fogg Company, Mundelein, IL (US)

( * ) Notice: Subject to any disclaimer, the term of this patent is extended or adjusted under 35 U.S.C. 154(b) by 812 days.

This patent is subject to a terminal disclaimer.

(21) Appl. No.: 10/378,641

(22) Filed: Mar. 4, 2003

(65) Prior Publication Data

US 2003/0127818 A1 Jul. 10, 2003

Related U.S. Application Data

(63) Continuation of application No. 09/860,880, filed on May 18, 2001, now Pat. No. 6,572,127.

(51) Int. Cl.
*B60G 3/02* (2006.01)
*B62D 7/06* (2006.01)

(52) U.S. Cl. ............... 280/124.152; 280/93.502; 403/48; 411/383; 411/389

(58) Field of Classification Search ............ 280/93.51, 280/93.502, 124.106, 124.107, 124.152; 403/48, 47, 43; 411/383, 384, 389
See application file for complete search history.

(56) References Cited

U.S. PATENT DOCUMENTS

| | | | |
|---|---|---|---|
| 1,871,918 A | 8/1932 | Rossman | |
| 1,952,115 A * | 3/1934 | Borst, Jr. | 267/269 |
| 2,169,969 A | 8/1939 | Allison | |
| 2,477,447 A | 7/1949 | Fawick | |
| 3,024,040 A | 3/1962 | Muller | |
| 3,209,851 A | 10/1965 | Collins | |
| 3,315,952 A | 4/1967 | Vitonne | |
| 3,381,513 A | 5/1968 | Jouannet | |
| 3,879,051 A | 4/1975 | Kolbe | |
| 4,033,605 A | 7/1977 | Smith et al. | |
| 4,066,278 A | 1/1978 | Takagi | |
| 4,113,278 A | 9/1978 | Rissberger | |
| 4,150,842 A | 4/1979 | Hamada et al. | |

(Continued)

FOREIGN PATENT DOCUMENTS

EP 0 715 086 A1 6/1996

(Continued)

OTHER PUBLICATIONS

Fecht, Nikolaus; Chassis and Steering Components—From the component to the system: © 1998; pp. 1-70; Berlag Moderne Industrie.

(Continued)

*Primary Examiner*—Lesley D. Morris
*Assistant Examiner*—Joselynn Y. Sliteris
(74) *Attorney, Agent, or Firm*—Dana A. Alden

(57) ABSTRACT

A suspension link assembly for a vehicle suspension system. A preferred form comprises only three different kinds of components. The components are a stud shaft, a sleeve nut and a grommet. In an alternative form a barrel-shaped, molded plastic spacer is added. The link assembly lends itself to partial preassembly off the vehicle assembly line and delivery to the assembler as a kit.

64 Claims, 4 Drawing Sheets

U.S. PATENT DOCUMENTS

| | | | |
|---|---|---|---|
| 4,249,753 | A | 2/1981 | Froumajou |
| 4,334,697 | A | 6/1982 | Deweese |
| 4,369,988 | A | 1/1983 | Takagi |
| 4,519,467 | A | 5/1985 | Saunders |
| 4,552,379 | A | 11/1985 | Foster |
| 4,621,831 | A | 11/1986 | Takadera et al. |
| 4,627,665 | A | 12/1986 | Ewing et al. |
| 4,664,408 | A | 5/1987 | Saotome et al. |
| 4,712,776 | A | 12/1987 | Geno et al. |
| 4,784,406 | A | 11/1988 | Stinson |
| 4,838,062 | A | 6/1989 | Prenn |
| 4,875,703 | A | 10/1989 | Murakami |
| 4,883,287 | A | 11/1989 | Murakami et al. |
| 4,944,523 | A * | 7/1990 | Hardy et al. .......... 280/124.152 |
| 5,076,605 | A | 12/1991 | Umeda |
| 5,449,193 | A * | 9/1995 | Rivard et al. .......... 280/124.152 |
| 5,551,722 | A * | 9/1996 | Schwartz et al. ..... 280/124.152 |
| 5,595,452 | A | 1/1997 | Hill et al. |
| 5,597,173 | A | 1/1997 | Schindler et al. |
| 5,630,609 | A | 5/1997 | Shin |
| 5,702,121 | A | 12/1997 | Song |
| 5,704,631 | A * | 1/1998 | Sparks et al. .......... 280/124.106 |
| 5,707,073 | A | 1/1998 | Stuker et al. |
| 5,807,010 | A * | 9/1998 | Parker et al. ......... 280/124.107 |
| 5,829,769 | A | 11/1998 | Hillquist |
| 5,876,148 | A | 3/1999 | Kraps |
| 5,992,863 | A | 11/1999 | Forbes-Robenson et al. |
| 6,007,079 | A | 12/1999 | Kincaid et al. |
| 6,076,840 | A | 6/2000 | Kincaid et al. |
| 6,402,171 | B1 * | 6/2002 | Nickerson et al. .... 280/124.106 |
| 6,648,350 | B1 | 11/2003 | Clements et al. |

FOREIGN PATENT DOCUMENTS

| | | | |
|---|---|---|---|
| FR | 1 260 978 | A | 5/1961 |
| FR | 2 053 718 | A | 4/1971 |
| JP | 2-11244 | | 1/1990 |
| JP | 10-236127 | | 9/1998 |

OTHER PUBLICATIONS

GMT315 Rear STABARLINK, M.F. DWG. No. xP496-0076-015A, 1999, p. 1, MacLean-Fogg Company.

Torsius, Aalbert, European Search Report for EP02 771800.6-1264, May 7, 2007, p. 1-3, European Patent Office.

Manabu Niki, Office Action from Japanese Patent Office for Japanese Patent Application No. 2002-591283, Jun. 13, 2007, pp. 1-3, Japanese Patent Office.

* cited by examiner

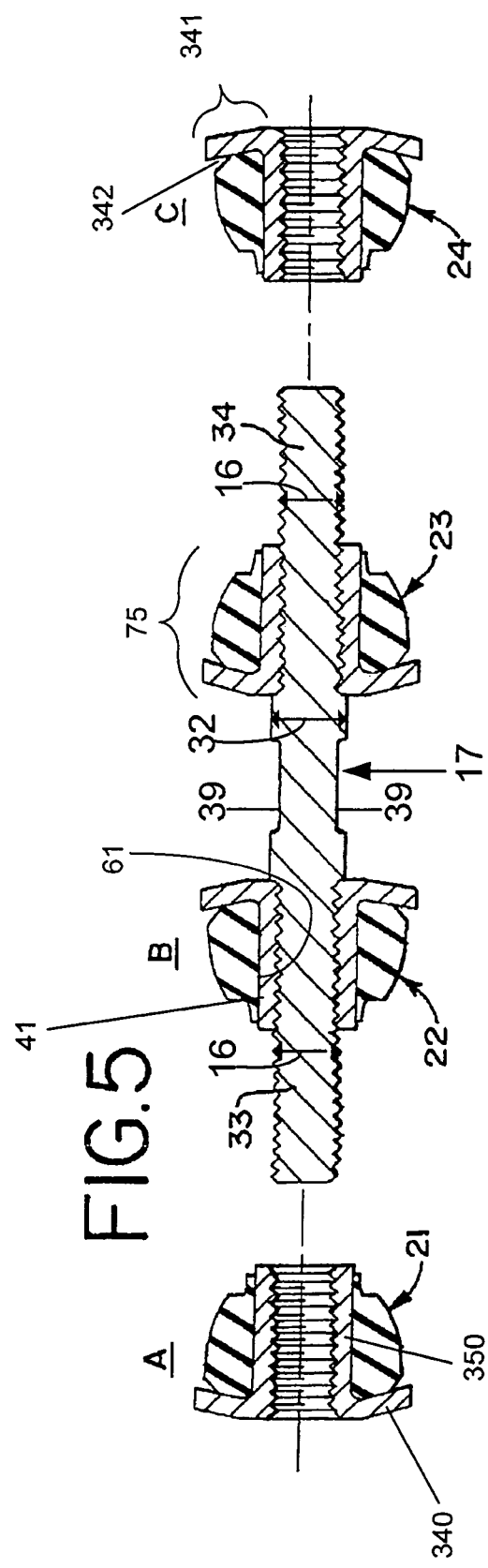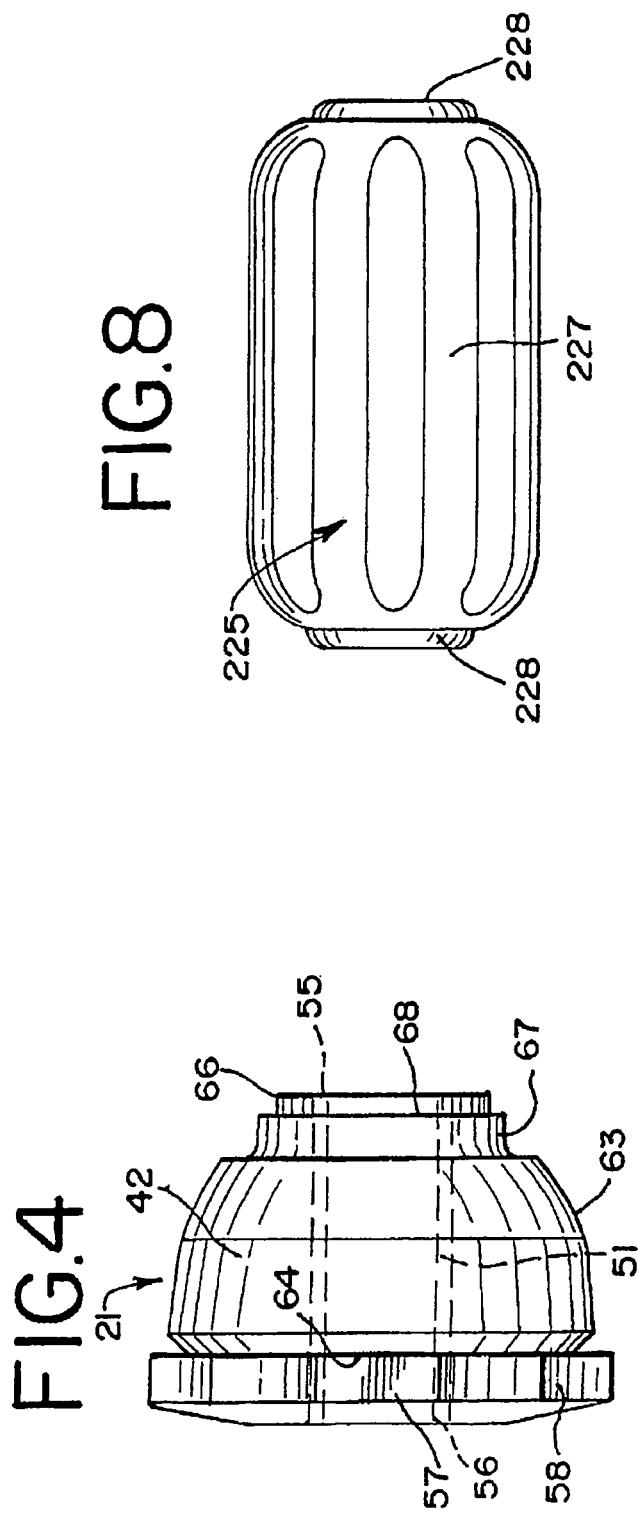

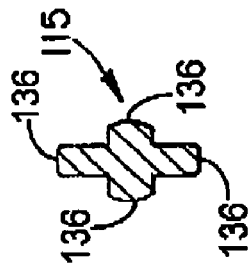
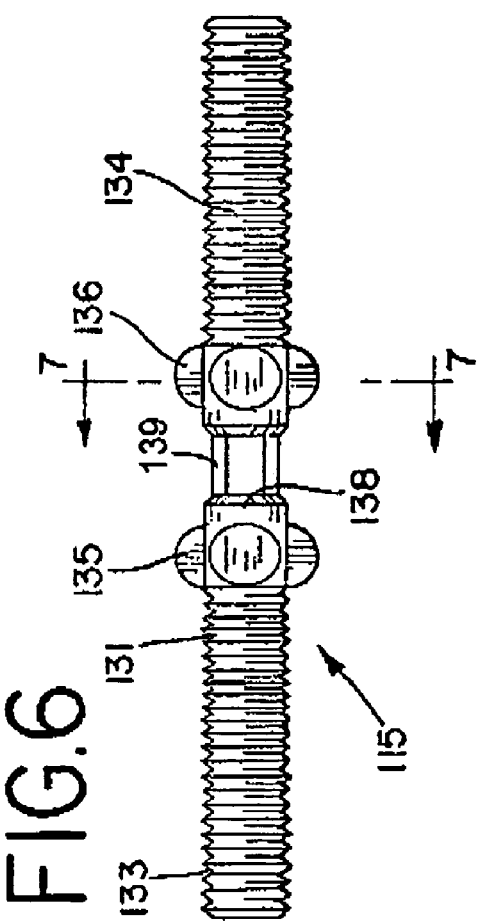
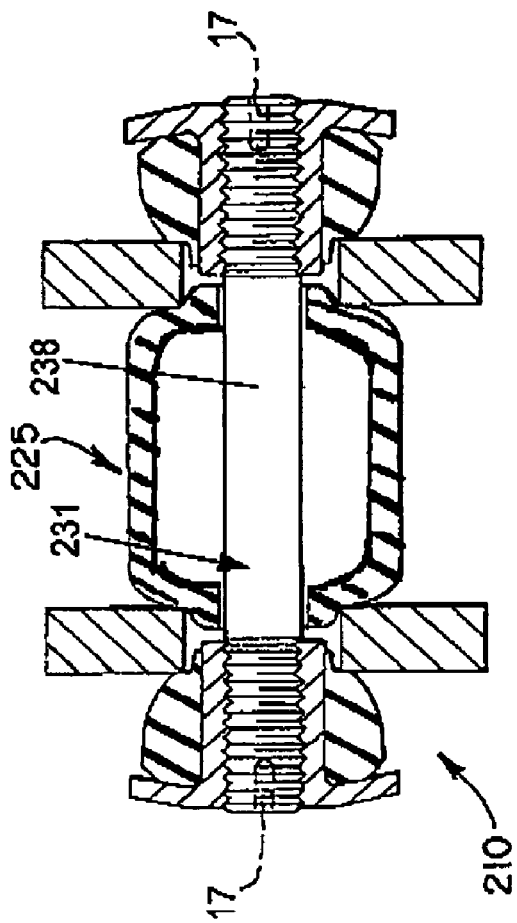

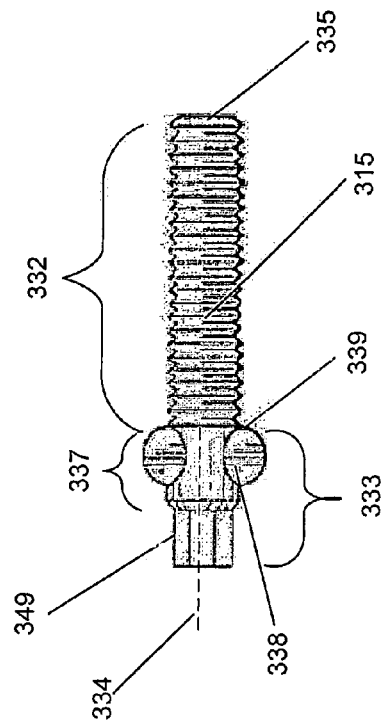
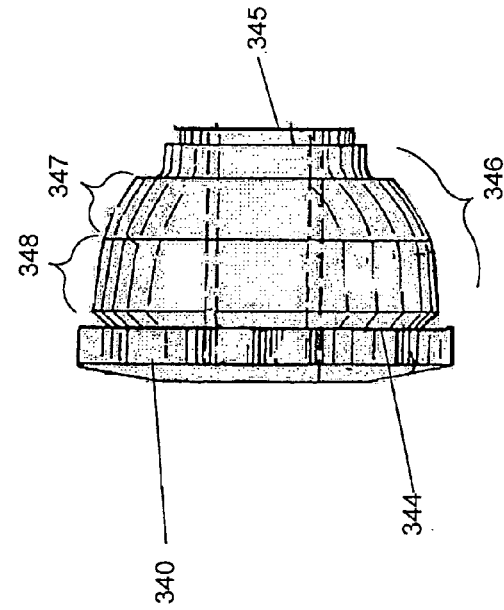
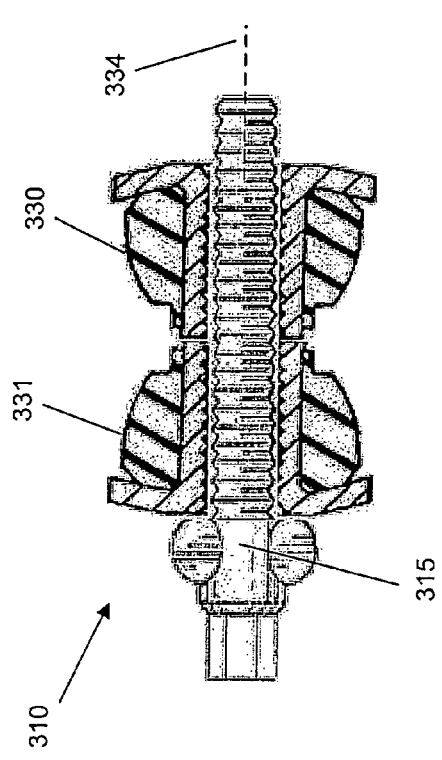
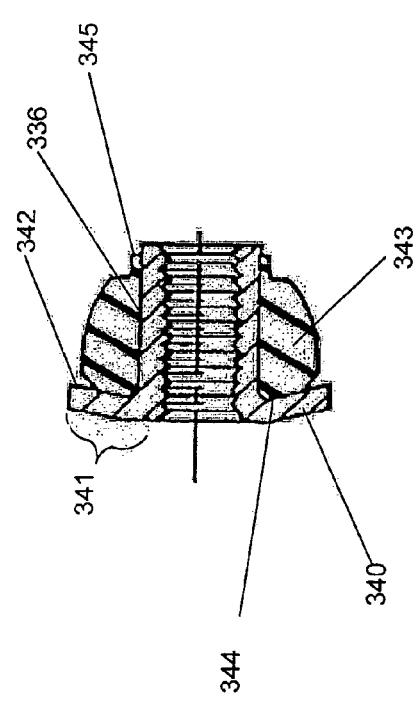

LINK ASSEMBLY FOR A VEHICLE SUSPENSION SYSTEM

This is a continuation of application Ser. No. 09/860,880, filed May 18, 2001, now U.S. Pat. No. 6,572,127.

FIELD OF THE INVENTION

This invention relates generally to vehicle suspension systems. It relates particularly to a link assembly for a suspension system.

BACKGROUND OF THE INVENTION

Motor vehicles have long been provided with independent suspension systems to absorb road shocks and other vibrations and provide a smoother, more comfortable ride. In suspension systems of this type, a stabilizer bar is normally incorporated to increase roll resistance and improve the steering stability of the vehicle. Typically, the stabilizer bar is a torsion rod which extends transversely of the vehicle. It has an integral crank arm provided at each end. The rod is rotatably supported from the vehicle chassis adjacent each crank arm, and each crank arm is coupled to a suspension arm by a connector link assembly.

When the vehicle is subject to forces which cause it to roll, the crank arms pivot relatively about the longitudinal axis of the rod, against the torsional resistance of the rod. Torsion forces which are exerted through the crank arms urge the suspension arms of the vehicle back toward their normal position. This type of stabilizer bar acts in a manner such that when paired left and right wheels differ in level from each other due to a cornering maneuver, for example, the vehicle body will be prevented from excessive rolling or leaning to either side by torsional resistance of the stabilizer bar.

The link assembly, which connects the crank arms of the torsion rod to the vehicle body and to the suspension arms, is generally one of two types. It is either a bolt-type assembly or a stud-type assembly. In a bolt-type assembly a suitably dimensioned bolt and nut are used to connect the stabilizer bar to the vehicle suspension arm. Pliable bushings or grommets assembled on the bolt engage the exterior surfaces of the stabilizer bar arms and the vehicle suspension arms. A pair of similarly shaped grommets engage the interior surfaces of the respective vehicle elements and are in engagement with a pair of inner washers which are maintained at a predetermined spaced distance by a cylindrical sleeve mounted on the shaft of the bolt.

In a stud-type assembly, the stud shaft has both ends threaded. Accordingly, retainer nuts are threaded onto both ends of the stud shaft. Once again, pliable bushings or grommets assembled on the stud shaft engage the exterior surfaces of the stabilizer bar arms and the vehicle suspension arms. A pair of similarly shaped grommets engage the interior surfaces of the respective vehicle elements and are in engagement with a pair of inner washers which are maintained at a predetermined spaced distance by a cylindrical sleeve mounted on the shaft of the stud.

Regardless of whether a bolt or stud-type link assembly is employed, prior art constructions have generally suffered from complexity and cost shortcomings. Such assemblies normally comprises at least four, and sometimes as many as six, different components. Furthermore, assembly is normally done on the vehicle assembly line from these many components.

SUMMARY OF THE INVENTION

An object of the present invention is to provide an improved suspension link assembly for a vehicle suspension system.

Another object is to provide an improved stud-type suspension link assembly which is simpler in construction and less expensive than existing link assemblies.

Still another object is to provide a stud-type suspension link assembly which is easier to fabricate and install than existing link assemblies.

Yet another object is to provide a stud-type suspension link assembly which is composed of only three different kinds of components.

A further object is to provide a stud-type suspension link assembly which can be delivered to the vehicle manufacturer's assembly line in preassembled sub-assemblies.

The foregoing and other objects are realized in accord with the present invention by providing a suspension link assembly which, in its preferred form, comprises only three different kinds of components. The three components are a stud shaft having identical threaded sections at each end, a sleeve nut and a grommet. Four of the grommets, four of the sleeve nuts and a stud shaft make up the assembly.

Each assembly thus comprises nine components; four sleeve nuts, four grommets and a stud shaft, but only three different kinds of components. Furthermore, the vehicle manufacturer can purchase and deliver the assemblies to the vehicle assembly line as a kit comprising only two different sub-assemblies. In one, the stud shaft is preassembled with two sleeve nut and grommet sub-assemblies. The other comprises a sleeve and grommet sub-assembly, of which two are called for.

BRIEF DESCRIPTION OF THE DRAWINGS

The invention, including its construction and method of operation, is illustrated more or less diagrammatically in the drawings, which:

FIG. 4 is an enlarged side elevational view of a sleeve nut and grommet sub-assembly for the link assembly of the invention;

FIG. 5 is an exploded view of the three sub-assemblies which make up a suspension link assembly embodying features of the present invention;

FIG. 6 is a side elevational view of a modified stud shaft;

FIG. 7 is a sectional view taken along line 7-7 of FIG. 6;

FIG. 8 is a side elevational view of a spacer for a second embodiment of link assembly comprising features of the invention;

FIG. 9 is a sectional view of the second embodiment of link Assembly;

FIG. 10 is a schematic sectional view of a link for a vehicle suspension system;

FIG. 11 is a side schematic elevational view of a shaft;

FIG. 12 is a schematic sectional view of a sleeve nut and a grommet; and

FIG. 13 is a schematic side elevational view of a sleeve nut and a grommet.

DESCRIPTION OF THE PREFERRED EMBODIMENT

Figure 1:
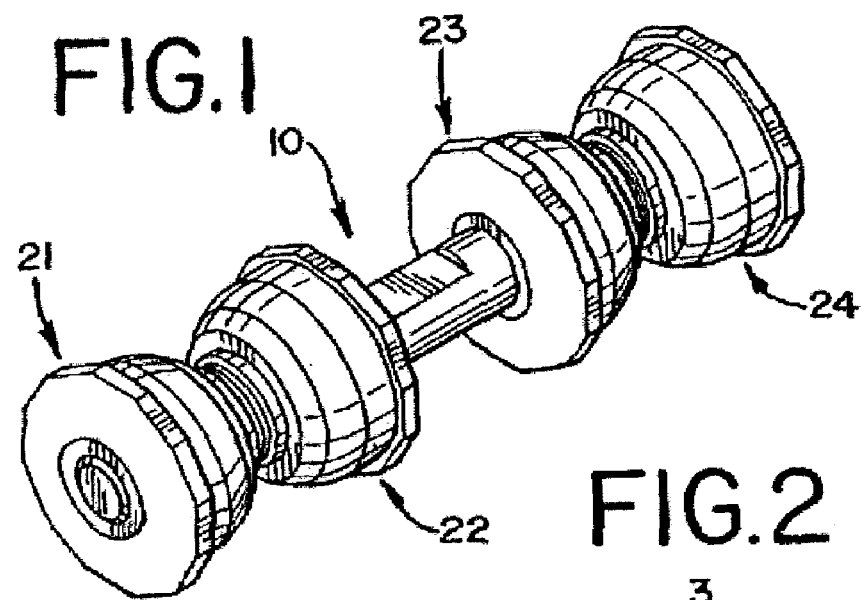
FIG. 1 is a perspective view of a link assembly comprising features of the present invention.
Figure 2:
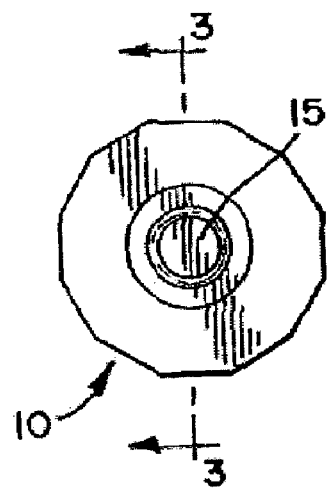
FIG. 2 is an end view of the link assembly of FIG. 1.
Figure 3:
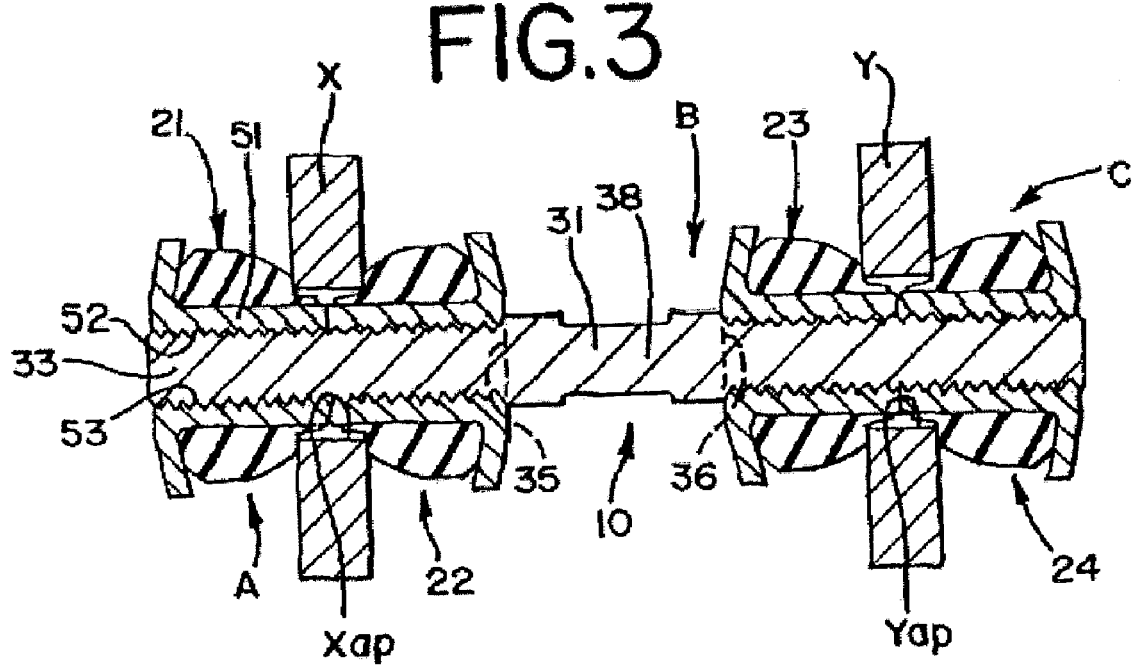
FIG. 3 is a sectional view along line 3-3 of FIG. 2, with portions of a vehicle stabilizer bar crank arm and a suspension system arm shown connected by the link assembly of FIGS. 1 and 2.

Referring now to the drawings, a suspension link assembly embodying features of the invention is seen generally at 10 in FIGS. 1-3. The link assembly 10 includes a stud shaft 15 on which four identical sleeve nut and grommet subassemblies 21-24 are mounted.

The stud shaft 15 includes a shaft body 31 of predetermined length. The shaft body 31 has threaded sections 33 and 34 at each end. The threaded end sections 33 and 34 are provided with a first diameter 16. In the preferred embodiment depicted, the threaded end section 33 terminates at a stop comprising a chamfer 35 and the threaded end section 34 terminates at a stop comprising a chamfer 36. The chamfers 35 and 36 are provided at opposite ends of a center spacer section 38. The spacer section 38 is provided with a second diameter 32. As shown in FIG. 5, the second diameter 32 of the shaft body 31 is larger than the first diameter 16 of the shaft body 31. Also shown therein, the shaft body 31 is provided with at torque transmitter 17. In the preferred embodiment, the section 38 is provided with a rorque transmitter 17 in the shape of flats formed on opposite sides, as at 39, for reasons hereinafter explained. The stud shaft 15 is fabricated of steel which is plated for corrosion resistance.

Since the nut and grommet sub-assemblies 21-24 ate identical, only the sub-assembly 21 is described in detail. Corresponding reference numerals may be applied to corresponding components in each of the other sub-assemblies 22-24.

Referring to FIG. 4 in addition to FIGS. 1-3, the sub-assembly 21 comprises a tubular sleeve nut 41 and a grommet 42. The nut 41 is formed from heat treated carbon steel. The grommet 42 is molded of resilient material such as natural rubber or polyurethane or the like.

The nut 41 comprises a tubular segment 51 with a bore 52 which is internally threaded at 53 (and hence may also be referred to as a "nut body"). Both ends of the threaded bore 52 are formed with a 45° chamfer, as at 55 and 56. A shallow, cup-shaped, or disc-shaped, head 57 is formed at one end of the tubular segment 51 (also referred to herein as a cup-shaped head or element) so that a nut-disc subassembly 75 is provided. The nut-disc subassembly 75 is shaped to transmit torque; the periphery 58 of the disc-shaped head 57 is polygon-shaped, for reasons hereinafter explained.

FIG. 12 shows a cup-shaped element 340 that extends radially from the axis 334 of the shaft 315. The cup-shaped element 340 includes a convex surface 341 and a concave surface 342. As shown in FIG. 10, the convex surface 341 of the cup-shaped element 340 contacts, at least in part, the stop 339 on the shaft 315. The outer grommet 330 and the inner grommet 331 are represented in FIG. 10 and include a grommet body 343. FIG. 13 depicts a first grommet side 344 and a second grommet side 345 of the grommet body 343.

The molded elastomer grommet 42 has a cylindrical bore 61 through it. The bore 61 has an inside diameter (10) which is slightly smaller than the outside diameter (00) of the tubular segment 51 in the nut 41.

The grommet 42 also has a generally "bee-hive" shape external surface 63 on its inner end. Referring now to FIG. 13, the first grommet side 344 of the grommet body 343 faces the concave surface 342 of the cup-shaped element 340. The second grommet side 345 includes an arm engaging portion 346 that engages an arm of a vehicle suspension system. The arm engaging portion 346 includes a first sloped surface 347 and a second sloped surface 348. The first sloped surface 347 and the second sloped surface 348 extend both radially from the axis 334 of the shaft 315 and axially from the second grommet side 345 of the grommet body 343. As shown in FIG. 4. the outer end of the grommet 42 has a slightly spherical surface 64 which is complementary in shape to the disc-shaped head 57.

The sleeve nut and grommet sub-assembly 21 is assembled by press fitting a grommet 42 over a tubular segment 51 of a nut 41 until the surface 64 of the grommet seats against the cup-shaped head 57 of the nut. Since the ID of the bore 61 is slightly smaller than the OD of the nut's tubular segment 51, the grommet resiliently grips the nut 41. When assembled, the free end 66 of the tubular segment 51 on the nut 41 protrudes slightly beyond a cylindrical lip 67 on which the end surface 68 of the grommet 42 is formed.

Referring now also to FIG. 5, the three different components of the assembly 10 the stud shaft 15, sleeve nuts 41 and grommets 42 are optionally preassembled by the vehicle manufacturer into three component assemblies A, Band C before being sent as a kit to the assembly line. In a pre-assembly operation, four sleeve nut and grommet sub-assemblies 21-24 are assembled in the afore-described manner. Two of the sleeve nut and grommet sub-assemblies, 22 and 23 in the drawings, are then threaded onto opposite end sections 33 and 34, respectively, of the stud shaft body 31. This creates the component assembly B. Two sleeve nut and grommet sub-assemblies 21 and 24, which are identical to each other, comprise the component assemblies A and C.

As shown in FIG. 5. the sleeve nut 41 includes a nut body 350 and a cup-shaped element 340. The nut body 350 is threaded and conforms with the threaded section 33 of the shaft 15. The cup-shaped element includes a concave surface 342 and a convex surface 341. As used herein, the term sleeve nut 41 shall refer to a nut body 350 that, in combination with a cup-shaped element 340, holds a grommet 42 in place on a link.

Referring again to FIG. 3, the three component assemblies A, B and C are mated with the suspension arm X and a torsion bar arm Y in the manner illustrated. The opposite ends of the component assembly B are inserted through suitably dimensioned apertures Xap and Yap in the respective arms X and Y. The apertures Xap and Yap have diameters large enough so that a cylindrical lip 67 of a corresponding grommet 42 extends into each aperture. The sleeve nut and grommet sub-assembly 21 is then threaded onto one end of the shaft body 31 and the sub-assembly 24 is threaded onto the other end. Corresponding grommet 42 engage respective arms X and Y in the manner just described.

This initial assembly is easily accomplished by hand. Only three items (assemblies A, B and C) need be handled by the assembler so assembly time is minimized. The assembler then grips the shaft body 31 on the flats 39 with a wrench and tightens the sleeve nuts 41 (the periphery 58 of the disc-shaped head or element 57 is polygon shaped) with another wrench.

When fully assembled, the ends 68 of the tubular segments 51 abut each. The faces 63 of opposed bushings 42, which engage respective arms X and Y l are then spaced from each other a distance which just accommodates the thickness of corresponding arms.

Referring now to FIGS. 6 and 7 of modified form of stud shaft for a link assembly 10 is shown at 115. The stud shaft 115 comprises a shaft body 131 having threaded end sections 133 and 134, and a center spacer section 138.

One end of the spacer section 138 has four protruding upsets 135 formed therein. The other end has four protruding upsets 136 formed therein. A torque transmitter 17 in the shape of 139, which are formed on opposite sides of the spacer section 138.

The stud shaft 115 is employed in the manner of link assembly 10. The upsets 135 and 136 serve as stops for two inside sleeve nut and grommet sub-assemblies identical to sub-assemblies 22 and 23 previously described. In all other respects the link assembly would be identical to assembly 10.

Referring flow to FIGS. 8 and 9, a link assembly comprising a second embodiment of the invention is seen generally at 210. The link assembly 210 is identical to the assembly 10 previously described except for two features. First, the sleeve nut and grommet assemblies 22 and 23 are replaced by a unitary spacer 225. Second the center spacer section 238 of the stud shaft body 231 does nor have a torque transmitter 17 in the shape of opposed flats formed on it but, instead, the stud shaft body 231 is provided with a torque transmitter 17 comprising a socket. In the embodiment depicted the stud shaft body 231 is provided with first and second torque transmitter 17, which comprise are sockets formed axially into opposite ends.

The spacer 225 is a hollow, barrel shaped body molded of polyurethane. It includes a plurality of longitudinally extending ribs 227 which serve to enhance its axial rigidity and strength. It has annular collars 228 formed at each end. The diameter of each collar 228 is such that it seats in the corresponding suspension arm aperture.

Referring now to FIG. 10, the link assembly 310 includes a shaft 315, an outer grommet 330, and an inner grommet 331, FIG. 11 depicts the shaft 315 including an outer surface 349, a grommet-accommodating portion 332, a grommet-free portion 333, an axis 334, and an end 335. The outer grommet 330 and the inner grommet 331 include a passage 336 dimensioned to accept the grommet-accommodating portion 332 of the shaft 315, as shown in FIG. 12.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein.

The invention claimed is:

1. A link assembly for a vehicle suspension system comprising:
   a) a steel stud shaft provided with a threaded section, an upset that includes said steel and shaped to function as a stop, and a torque transmitter;
   b) a sleeve nut threaded onto the stud shaft;
   c) the sleeve nut is provided with a nut body and a cup-shaped element;
   d) the cup-shaped element includes a concave surface and a convex surface; and
   e) a first grommet held in place, at least in part, by the concave surface of the cup-shaped element to form a first sleeve nut and grommet sub-assembly.

2. The link assembly of claim 1, wherein the torque transmitter comprises a plurality of flats.

3. The link assembly of claim 1, wherein the cup-shaped element and the nut body are integrally formed from heat treated carbon steel.

4. The link assembly of claim 1, further comprising a spacer section, wherein the upset is generally located at an end of the spacer section.

5. The link assembly of claim 1, wherein:
   a) the steel stud shaft is provided with an axis;
   b) the first grommet is provided with a passage, a first sloped surface, a second sloped surface, a first side, and a second side;
   c) the first and second sloped surfaces extend, at least in part, both axially from the second side of the first grommet and radially from the passage; and
   d) the first side of the first grommet faces the concave surface of the cup-shaped element while the second side of the first grommet faces a second grommet.

6. The link assembly of claim 1, further comprising:
   a) a spacer section that is provided with an end; and
   b) the upset is generally located at the end of the spacer section.

7. The link assembly of claim 1, further comprising a spacer section, wherein the spacer section is plated for corrosion resistance.

8. The link assembly of claim 1, wherein the torque transmitter includes a plurality of flat surfaces for wrenching.

9. The link assembly of claim 1, further comprising:
   a) a spacer section that is provided with an end;
   b) the upset and the torque transmitter are located, at least in part, on the spacer section with the upset generally located at the end of the spacer section;
   c) the torque transmitter is provided with a plurality of flat surfaces configured to cooperate with a wrench; and
   d) the shaft has been plated for corrosion resistance.

10. The link assembly of claim 1, further comprising:
    a) a bore defined within the cup-shaped element and dimensioned to accept the stud shaft;
    b) the cup shaped element extends radially from the bore to a periphery; and
    c) the first grommet has a curved surface at one end complementary in shape to the cup-shaped element and an opposite face for engaging an arm.

11. The link assembly of claim 1, wherein:
    a) the sleeve nut includes a tubular segment of a predetermined outside diameter; and
    b) the first grommet has a passage therethrough with an inside diameter slightly smaller than the predetermined outside diameter.

12. A link assembly for a vehicle suspension system comprising:
    a) a stud shaft provided with a threaded section that includes a first diameter and a spacer section that includes a second diameter, wherein the first diameter located on the threaded section is smaller than the second diameter located on the spacer section;
    b) a sleeve nut threaded onto the stud shaft;
    c) the sleeve-nut is provided with a nut body and a cup-shaped element;
    d) the cup-shaped element includes a concave surface and a convex surface;
    e) a grommet held in place, at least in part, by the concave surface of the cup-shaped element to form a sleeve nut and grommet sub-assembly; and
    f) an upset that includes a steel and shaped to function as a stop.

13. The link assembly of claim 12 further comprising:
    a) the spacer section that is provided with an end; and
    b) the upset is generally located at the end of the spacer section.

14. The link assembly of claim 12, wherein the stud shaft is plated for corrosion resistance.

15. The link assembly of claim 12, wherein the nut body and the cup-shaped element are integrally formed from heat treated carbon steel.

16. The link assembly of claim 12, wherein the grommet is molded of a resilient material.

17. The link assembly of claim 12, further comprising:
a) a plurality of flats;
b) the stud shaft includes a grommet-free portion; and
c) the plurality of flats are located on the grommet-free portion of the shaft.

18. The link assembly of claim 12, wherein the sleeve nut includes a tubular segment.

19. The link assembly of claim 12, further comprising:
a) the spacer section is provided with an end;
b) the upset and a torque transmitter are located, at least in part, on the spacer section with the upset generally located at the end of the spacer section;
c) the torque transmitter is provided with a plurality of flat surfaces configured to cooperate with a wrench; and
d) the shaft has been plated for corrosion resistance.

20. The link assembly of claim 12, wherein:
a) the sleeve nut includes a tubular segment; and
b) the grommet has a curved surface at one end complementary in shape to the cup-shaped element and an opposite face for engaging an arm.

21. The link assembly of claim 12, wherein:
a) the sleeve nut includes a tubular segment of a predetermined outside diameter; and
b) the grommet has a passage therethrough with an inside diameter slightly smaller than the predetermined outside diameter.

22. A link assembly for a vehicle suspension system comprising:
a) a shaft consisting essentially of a steel that has been upset to provide a stop that includes said steel and that is located on a grommet-free portion of the shaft;
b) the shaft includes a torque transmitter, an outer surface, an end, an axis, and a grommet-accommodating portion that carries an outer grommet and an inner grommet;
c) the outer grommet and the inner grommet are provided with passages dimensioned to accept the grommet-accommodating portion of the shaft;
d) a sleeve nut including a cup-shaped element that includes a concave surface and a convex surface;
e) the outer grommet and the inner grommet are located on the grommet-accommodating portion of the shaft, with the inner grommet located closer to the grommet-free portion of the shaft than the outer grommet;
f) each of the inner and outer grommets is provided with a grommet body that includes a first grommet side and a second grommet side;
g) the first grommet side, at least in part, contacts the cup-shaped element while the second grommet side, at least in part, contacts an arm of a vehicle suspension system;
h) the cup-shaped element contacts, at least in part, the stop so as to prevent the inner grommet from moving axially onto the grommet-free portion of the shaft; and
i) the stop is configured to prevent the inner grommet from moving axially onto the grommet-free portion of the shaft.

23. The link assembly of claim 22, further including a nut body.

24. The link assembly of claim 22, further comprising:
a) a nut body; and
b) the cup-shaped element and the nut body are integrally formed from heat treated carbon steel.

25. The link assembly of claim 22, further comprising:
a) a spacer section;
b) a center section, wherein the spacer section is located so as to include, at least a portion of, the center section of the shaft; and
c) a threaded section, wherein the threaded section is generally located at the end of the shaft.

26. The link assembly of claim 22, wherein a spacer section is plated for corrosion resistance.

27. The link assembly of claim 22, wherein the torque transmitter includes a plurality of flat surfaces for wrenching.

28. The link assembly of claim 22, further comprising:
a) a spacer section that is provided with an end;
b) the upset and the torque transmitter are located, at least in part, on the spacer section with the upset generally located at the end of the spacer section;
c) the torque transmitter is provided with a plurality of flat surfaces configured to cooperate with a wrench; and
d) the shaft has been plated for corrosion resistance.

29. The link assembly of claim 22, further comprising:
a) a nut body; and
b) a threaded section on the shaft.

30. The link assembly of claim 22, further including:
a) a nut body;
b) a threaded section on the shaft; and
c) at least one of the grommet bodies is molded of a resilient material.

31. The link assembly of claim 22, wherein, at least one of the grommet bodies includes a first sloped surface and a second sloped surface.

32. The link assembly of claim 22, further comprising:
a) a nut body;
b) a threaded section on the shaft; and
c) at least one of the grommet bodies includes a first sloped surface and a second sloped surface.

33. The link assembly of claim 22, further comprising:
a) a nut body;
b) a threaded section on the shaft; and
c) the shaft is plated for corrosion resistance.

34. A link assembly for a vehicle suspension system comprising:
a) a stud shaft provided with a torque transmitter, an upset that includes a steel and shaped to function as a stop, a spacer section, and a threaded section;
b) a sleeve nut threaded onto the threaded section;
c) the sleeve-nut is provided with a nut body and a cup-shaped element;
d) the cup-shaped element includes a concave surface and a convex surface; and
e) a first grommet held in place, at least in part, by the concave surface of the cup-shaped element to form a first sleeve nut and grommet sub-assembly.

35. The link assembly of claim 34, wherein the upset is generally located at an end of the spacer section.

36. The link assembly of claim 34, wherein the stud shaft is plated for corrosion resistance.

37. The link assembly of claim 34, wherein the torque transmitter comprises a plurality of flats located on the spacer section.

38. The link assembly of claim 34, wherein the nut body and the cup-shaped element are integrally formed from heat treated carbon steel.

39. The link assembly of claim 34, wherein the grommet is molded of a resilient material.

40. The link assembly of claim 34, further comprising:
a) a plurality of flats;
b) the stud shaft includes a grommet-free portion; and c) the plurality of flats are located on the grommet-free portion of the shaft.

41. The link assembly of claim 34, wherein the sleeve nut includes a tubular segment.

42. The link assembly of claim 34, further comprising:
a) the spacer section provided with an end;
b) the upset and the torque transmitter are located, at least in part, on the spacer section with the upset generally located at the end of the spacer section;
c) the torque transmitter is provided with a plurality of flat surfaces configured to cooperate with a wrench; and
d) the shaft has been plated for corrosion resistance.

43. The link assembly of claim 34, wherein:
a) the sleeve nut includes a tubular segment; and
b) the first grommet has a curved surface at one end complementary in shape to the cup-shaped element and an opposite face for engaging an arm.

44. The link assembly of claim 34, wherein:
a) the sleeve nut includes a tubular segment of a predetermined outside diameter; and
b) the first grommet has a passage therethrough with an inside diameter slightly smaller than the predetermined outside diameter.

45. A link assembly for a vehicle suspension system comprising:
a) a shaft that includes a spacer section consisting essentially of a steel;
b) the shaft has been upset to provide a stop that includes said steel;
c) the stop is located, at least in part, on the spacer section of the shaft;
d) a torque transmitter that is located, at least in part, on the spacer section of the shaft;
e) the shaft includes an outer surface, an end, an axis, and a grommet-accommodating portion that carries an outer grommet and an inner grommet;
f) the outer grommet and the inner grommet are provided with passages dimensioned to accept the grommet-accommodating portion of the shaft;
g) a first and second sleeve nut each having a cup-shaped element that includes a concave surface and a convex surface;
h) the outer grommet and the inner grommet are located on the grommet-accommodating portion of the shaft, with the inner grommet located closer to the spacer section of the shaft than the outer grommet:
i) each of the inner and outer grommets is provided with a grommet body that includes a first grommet side and a second grommet side;
j) the first grommet side, at least in part, contacts the cup-shaped element while the second grommet side, at least in part, contacts an arm of a vehicle suspension system;
k) the cup-shaped element contacts, at least in part, the stop so as to prevent the inner grommet from moving axially onto the spacer section of the shaft; and
the stop is configured to prevent the inner grommet from moving axially onto the spacer section of the shaft.

46. The link assembly of claim 45, wherein:
a) the shaft is provided with an axis;
b) each of the grommets is provided with a first sloped surface and a second sloped surface;
c) the first and second sloped surfaces extend, at least in part, both axially from the second grommet side and radially from the passage; and
d) the first grommet side of the outer grommet faces the concave surface of the cup-shaped element while the second grommet side of the outer grommet faces the second grommet side of the inner grommet.

47. The link assembly of claim 45, further comprising:
a) the spacer section is provided with an end;
b) the upset and the torque transmitter are located, at least in part, on the spacer section with the upset generally located at the end of the spacer section;
c) the torque transmitter is provided with a plurality of flat surfaces configured to cooperate with a wrench; and
d) the shaft has been plated for corrosion resistance.

48. The link assembly of claim 45, further comprising:
a) a nut body that is threaded onto the shaft; and
b) the nut body and the cup-shaped element are integrally formed from heat treated steel.

49. The link assembly of claim 45, wherein the torque transmitter includes a plurality of flat surfaces for wrenching.

50. The link assembly of claim 45, further comprising:
a) a center section, wherein the spacer section is located so as to include, at least a portion of, the center section of the shaft; and
b) a threaded section, wherein the threaded section is generally located at the end of the shaft.

51. The link assembly of claim 45, wherein:
a) the spacer section is provided with an end; and
b) the upset is generally located at the end of the spacer section.

52. The link assembly of claim 45, wherein at least one of the grommets is molded of a resilient material.

53. The link assembly of claim 45, further comprising a nut body.

54. The link assembly of claim 45, further comprising:
a) a center section, wherein the spacer section is located so as to include, at least a portion of, the center section of the shaft;
b) a threaded section, wherein the threaded section is generally located at the end of the shaft;
c) the spacer section is provided with an end;
d) the upset and the torque transmitter are located, at least in part, on the spacer section with the upset generally located at the end of the spacer section;
e) the torque transmitter is provided with a plurality of flat surfaces configured to cooperate with a wrench;
f) a nut body that is threaded onto the shaft;
g) the nut body and the cup-shaped element are integrally formed from heat treated steel;
h) the shaft has been plated for corrosion resistance; and
i) at least one of the grommets is molded of a resilient material.

55. A link assembly for a vehicle suspension system comprising:
a) a shaft that includes a spacer section consisting essentially of a steel;
b) the shaft has been upset to provide a stop that includes said steel;
c) the stop is located, at least in part, on the spacer section of the shaft;
d) a torque transmitter that is located, at least in part, on the spacer section of the shaft;
e) the shaft includes an outer surface, an end, an axis, and a grommet-accommodating portion that carries an outer grommet and an inner grommet;
f) the outer grommet and the inner grommet are provided with passages dimensioned to accept the grommet-accommodating portion of the shaft;
g) a sleeve nut having a cup-shaped element that includes a concave surface and a convex surface;

the outer grommet and the inner grommet are located on the grommet-accommodating portion of the shaft, with the inner grommet located closer to the spacer section of the shaft than the outer grommet;

i) each of the inner and outer grommets is provided with a grommet body that includes a first grommet side and a second grommet side;

j) the cup-shaped element contacts, at least in part, the stop so as to prevent the inner grommet from moving axially onto the spacer section of the shaft; and k) the stop is configured to prevent the inner grommet from moving axially onto the spacer section of the shaft.

56. The link assembly of claim 55, wherein:

a) the shaft is provided with an axis;

b) each of the grommets is provided with a first sloped surface and a second sloped surface;

c) the first and second sloped surfaces extend, at least in part, both axially from the second grommet side and radially from the passage; and d) the first grommet side of the inner grommet faces the concave surface of the cup-shaped element while the second grommet side of the inner grommet faces the second grommet side of the outer grommet.

57. The link assembly of claim 55, further comprising:

a) the spacer section is provided with an end;

b) the upset and the torque transmitter are located, at least in part, on the spacer section with the upset generally located at the end of the spacer section;

c) the torque transmitter is provided with a plurality of flat surfaces configured to cooperate with a wrench; and d) the shaft has been plated for corrosion resistance.

58. The link assembly of claim 55, further comprising:

a) a nut body that is threaded onto the shaft; and b) the nut body and the cup-shaped element are integrally formed from heat treated steel.

59. The link assembly of claim 55, wherein the torque transmitter includes a plurality of flat surfaces for wrenching.

60. The link assembly of claim 55, further comprising:

a) a center section, wherein the spacer section is located so as to include, at least a portion of, the center section of the shaft; and b) a threaded section, wherein the threaded section is generally located at the end of the shaft.

61. The link assembly of claim 55, wherein:

a) the spacer section is provided with an end; and b) the upset is generally located at the end of the spacer section.

62. The link assembly of claim 55, wherein at least one of the grommets is molded of a resilient material.

63. The link assembly of claim 55, further comprising a nut body.

64. The link assembly of claim 55, further comprising:

a) a center section, wherein the spacer section is located so as to include, at least a portion of the center section of the shaft;

b) a threaded section, wherein the threaded section is generally located at the end of the shaft;

c) the spacer section is provided with an end;

d) the upset and the torque transmitter are located, at least in part, on the spacer section with the upset generally located at the end of the spacer section;

e) the torque transmitter is provided with a plurality of flat surfaces configured to cooperate with a wrench;

f) a nut body that is threaded onto the shaft;

g) the nut body and the cup-shaped element are integrally formed from heat treated steel;

h) the shaft has been plated for corrosion resistance; and i) at least one of the grommets is molded of a resilient material.

* * * * *